May 23, 1972   J. A. CHILMAN   3,664,763
VARIABLE-PITCH BLADED ROTORS
Filed Nov. 3, 1969

INVENTOR
JOHN ALFRED CHILMAN
BY Young & Thompson
ATTORNEYS

United States Patent Office 3,664,763
Patented May 23, 1972

3,664,763
VARIABLE-PITCH BLADED ROTORS
John Alfred Chilman, Painswick, England, assignor to Dowty Rotol Limited, Gloucester, England
Filed Nov. 3, 1969, Ser. No. 873,464
Claims priority, application Great Britain, Nov. 15, 1968, 54,283/68
Int. Cl. B64c *11/38*
U.S. Cl. 416—157                                    1 Claim

ABSTRACT OF THE DISCLOSURE

Pitch-change mechanism for the blades of a variable-pitch bladed rotor comprise a fluid-operated vane-type actuator for mounting coaxially of the rotor and for rotation therewith. The actuator has a multiplicity of chambers formed by a first multi-vaned actuator part and a second multi-vaned actuator part. The two actuator parts are angularly movable in opposite directions about the rotation axis to drive the blades at substantially diametrically opposed points of the blades to vary their pitch angle.

---

Figure 1:
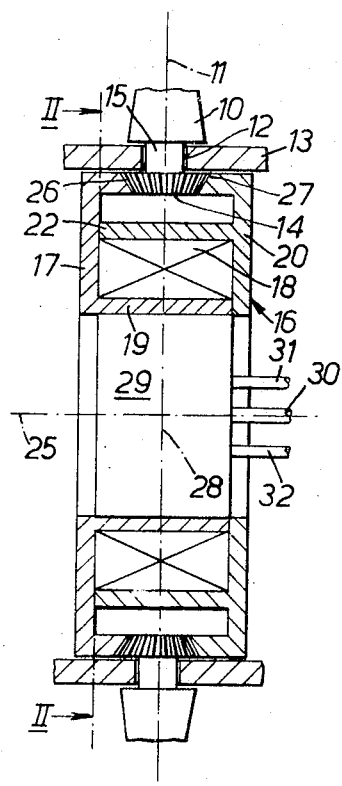

This invention relates to variable-pitch bladed rotors, and in particular to the pitch-change mechanism for the blades of such rotors.

One of the objects of the invention is to provide improved pitch-change mechanism which will afford greater design freedom in meeting given installational requirements while simultaneously eliminating journal loads on the blade roots and thereby permitting use of a hub structure of lighter construction than would otherwise be necessary.

According to the invention pitch-change mechanism for the blades of a variable-pitch bladed rotor comprises a fluid-operated vane-type actuator for mounting coaxially of the rotor and for rotation therewith, such actuator having a multiplicity of chambers formed by a first multi-vaned actuator part and a second multi-vaned actuator part, said two actuator parts being angularly movable in opposite directions about the rotation axis to drive the blades at substantially diametrically opposed points of the blades to vary their pitch angle.

As used herein the term "multi" is intended to mean three or more.

The vane-type actuator may be of annular form in a plane normal to the rotation axis. If desired the central circular space within the annulus may house valve means for controlling the flow of actuating fluid to and from the chambers of the actuator.

In one arrangement the median plane of the vane-type actuator, normal to the rotation axis, is coincident with the plane containing the pitch-change axes of the blades of the rotor.

The drive from each of the actuator parts to the blades may include bevel gearing having a substantial step-up ratio, as a result of which a small angular movement of the actuator parts results in a considerably larger angular movement of the blades about their pitch-change axes. Thus, each of the actuator parts may carry a large bevel wheel which meshes with a small bevel pinion on each of the blades, such large bevel wheels meshing with each of the small bevel pinions at diametrically opposite points of such pinions.

The foregoing arrangement is of particular advantage when applied to bladed rotors having a large multiplicity of blades, the large bevel wheels maintaining angular synchronism between al the blades during their pitch-changing movements. In such an arrangement each actuator part may also have a large multiplicity of vanes, whereby the dimensions of the actuator in the direction of the rotation axis may be reduced. Thereby, when the median plane of the actuator, normal to the rotation axis, is coincident with the plane containing the pitch-change axes of the blades of the rotor, the length of the actuator may be kept substantially within the limits of the hub length required for the mere mounting of the blades and the bevel pinions on their roots.

Figure 2:
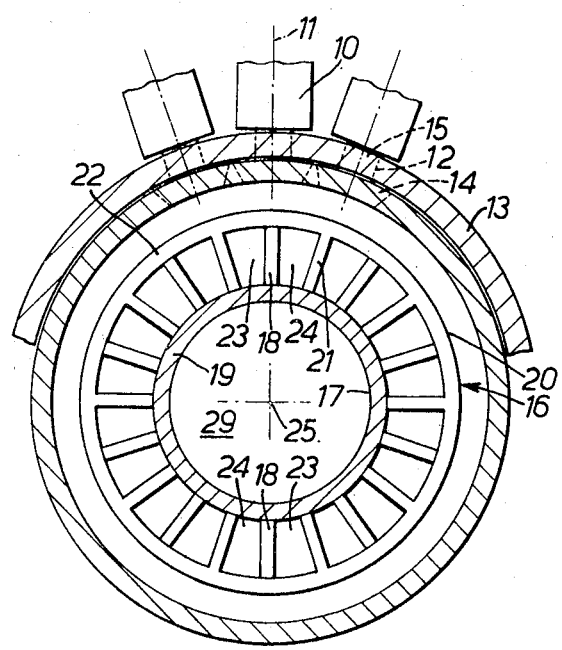

One example of a bladed rotor having a large multiplicity of blades is a variable-pitch by-pass fan of an aircraft gas turbine engine of the by-pass type. Such an embodiment of the invention is illustrated in the accompanying diagrammatic drawings, in which:

FIG. 1 is a sectional elevation of the variable-pitch bladed rotor taken through the rotation axis of the rotor, and, FIG. 2 is a cross-section taken along the line II—II of FIG. 1.

The rotor illustrated has blades 10 each of which is mounted for variation in pitch about its longitudinal pitch-change axis 11 in a bearing 12 provided in the hub structure of the rotor, part of which is shown at 13. Each blade has a small bevel pinion 14 mounted fast upon its root portion 15. In the illustrated embodiment the rotor has seventeen blades 10.

An hydraulic pitch-change actuator 16 of vane-type is mounted within the hub structure 13, the actuator being of annular form and comprising a first or inner part 17 having ten vanes 18 extending radially-outwardly from an inner portion 19 thereof, and a second or outer part 20 having ten vanes 21 extending radially-inwardly from an outer portion 22 thereof. The vanes 18 and 21 define ten actuator chambers 23 and ten actuator chambers 24.

The part 17, which is free to be moved angularly about the rotation axis 25 of the rotor with respect to the hub structure 13, is provided with a ring of bevel gear teeth 26 which form one of the aforesaid large bevel wheels, while the part 20, which is also free to be moved angularly about the rotation axis 25 with respect to the hub structure, is provided with a ring of bevel gear teeth 27 which form the other of the aforesaid large bevel wheels. The teeth 26 mesh with all the bevel pinions 14 and the teeth 27 also mesh with all the bevel pinions 14, the points of meshing of the teeth 26 with the pinions 14 being diametrically opposite to the points of meshing of the teeth 27 with the pinions 14.

The median plane 28 of the actuator, normal to the rotation axis 25 of the rotor, is coincident with the plane containing all the longitudinal pitch-change axes 11 of the blades 10.

Control of the actuator 16 is effected by means of a rotary control valve, indicated diagrammatically at 29, which is operable by a suitable mechanical input, indicated diagrammatically at 30, which takes account of rotor rotation with respect to fixed structure by incorporating a suitable translation device (not shown). Feedback means (also not shown) are provided to cause arrest of actuator movement when the actuator reaches the setting required by the control valve.

Liquid under pressure is supplied to the valve 29 through a conduit 31, while a drain conduit 32 is taken from the valve. A suitable transfer muff of conventional form, but not shown in the drawings, is provided to convey liquid from non-rotating structure to rotating structure, and vice versa.

The valve 29 is movable from a neutral position to one operative position in which liquid under pressure is directed through suitable porting (not shown) in the portion 19 to all ten actuator chambers 23, while the ten actuator chambers 24 are placed in communication with drain. In consequence, as viewed in FIG. 2, the part 17 moves in a clockwise direction and the part 20 moves in an anticlockwise direction, such movement being of equal magnitude and in such sense as to cause pitch-fining of the blades 10. The bevel gearing 14, 26 and 27 affords a substantial step-up ratio whereby small angular movement of the parts 17 and 20 about the rotation axis 25 results in a much larger angular movement of the blades 10 about their pitch-change axes 11.

Since the angular movements of the parts 17 and 20 are equal in magnitude, but opposite in sense, the turning moments applied to the blades 10 through the teeth 26 and 27 are equal and additive about the axes 11. However, since these moments are applied at positions diametrically opposite each other upon each blade root, a balance is achieved in the journal loading of the blade root bearing 12.

The control valve 29 is of the follow-up type so that as the selected blade pitch is reached, the valve regains its neutral position. The valve 29 is movable also in the opposite direction from the neutral position to a second operative position for blade pitch-coarsening operation of the actuator. In such operative position of the valve 29 pressure liquid is supplied to all ten actuator chambers 24, while the ten actuator chambers 23 are placed in communication with drain.

The balance achieved in the journal loading at each blade root bearing 12 avoids the setting-up of friction-producing forces at the blade roots during pitch-changing movement and thus reduces the hydraulic effort required for pitch-change.

By so arranging that the median plane 28 of the actuator 16 is coincident with the plane containing all the pitch-change axes 11 of the blades 10, a compact construction of variable-pitch bladed rotor is achieved. However, the invention is not limited to constructions in which exact coincidence of these planes is present as in other embodiments such planes may be only substantially coincident, acceptable compactness of construction still being achieved.

In fact, in other arrangements the median plane of the actuator may be deliberately offset from the plane containing the pitch-change axes of the blades of the bladed rotor, the dimensions of the actuator vanes being increased in the direction of the rotation axis and their radial dimension correspondingly reduced in order to give a slim overall construction resulting in a low aspect ratio, as may be required with a bladed rotor having perhaps only two blades, as for example in a ram-air turbine.

Since the control valve is housed within the actuator, substantially direct communication between the valve and the actuator chambers is afforded, giving immediate operative response to the demands of the valve.

It will be understood that the invention is not limited to the provision of a rotory control valve or to manually-initiated control of the actuator, as in other embodiments different forms of control valve may be used. Moreover, the actuator may be controlled by a speed-responsive governor.

I claim:
1. A variable-pitch bladed rotor having a large diameter rotor hub and a large number of blades on the hub, and pitch-change mechanism for said blades comprising a fluid-operated vane-type actuator mounted coaxially of the rotor and for rotation therewith, said actuator having a multiplicity of chambers formed by a first actuator part with at least three vanes and a second actuator part with a corresponding number of vanes, said two actuator parts being angularly movable in opposite directions about the rotation axis to drive the blades at substantially diametrically opposed points of the blades to vary their pitch angle, the axial dimension of the actuator being less than half its diametral dimension, the drive from each of the actuator parts to the blades including bevel gearing connected to the respective parts of the actuator and having a substantial step-up ratio, the actuator being in the form of an annulus, and valve means housed entirely within the central space within said annulus to control the flow of actuating fluid to and from the chambers of the actuator, whereby the axial extent of the mechanism is reduced.

References Cited

UNITED STATES PATENTS

| 2,379,302 | 6/1945 | Hoover | 416—154 |
| 2,521,557 | 9/1950 | Wyckoff | 91—376 A X |
| 2,708,353 | 5/1955 | Brady | 91—376 A X |
| 3,103,209 | 9/1963 | Bekkala et al. | 92—122 X |
| 2,954,830 | 10/1960 | Gehres | 92—122 X |
| 3,468,473 | 9/1969 | Davies et al. | 416—157 |

FOREIGN PATENTS

| 837,728 | 6/1960 | Great Britain | 92—122 |
| 423,255 | 7/1947 | Italy | 92—122 |

EVERETTE A. POWELL, JR., Primary Examiner

U.S. Cl. X.R.

92—122